(12) United States Patent
Seitter et al.

(10) Patent No.: US 9,196,408 B2
(45) Date of Patent: *Nov. 24, 2015

(54) METHOD FOR MANUFACTURING A METAL COMPOSITE COMPONENT, IN PARTICULAR FOR AN ELECTROMAGNETIC VALVE

(75) Inventors: Max Seitter, Muehlacker (DE); Stefan Oetinger, Stegaurach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 987 days.

This patent is subject to a terminal disclaimer.

(21) Appl. No.: 12/737,383

(22) PCT Filed: Jul. 17, 2009

(86) PCT No.: PCT/EP2009/059203
§ 371 (c)(1),
(2), (4) Date: Mar. 22, 2011

(87) PCT Pub. No.: WO2010/007151
PCT Pub. Date: Jan. 21, 2010

(65) Prior Publication Data
US 2011/0163256 A1  Jul. 7, 2011

(30) Foreign Application Priority Data

Jul. 18, 2008 (DE) .......................... 10 2008 040 549

(51) Int. Cl.
*H01F 1/04* (2006.01)
*H01F 7/08* (2006.01)
(Continued)

(52) U.S. Cl.
CPC .............. *H01F 7/081* (2013.01); *B32B 15/011* (2013.01); *C21D 1/26* (2013.01); *C21D 2211/001* (2013.01); *H01F 7/1607* (2013.01); *H01F 2007/085* (2013.01)

(58) Field of Classification Search
CPC ... B23P 15/001; B23P 25/00; C21D 2221/00; C21D 8/1294; F02M 2200/08; F02M 2200/9061
USPC ......................................................... 148/121
See application file for complete search history.

(56) References Cited

U.S. PATENT DOCUMENTS 3,278,298 A * 10/1966 Perry ............................. 420/43
3,633,139 A    1/1972 Thompson
(Continued)

FOREIGN PATENT DOCUMENTS

DE       2 317 983        11/1974
DE       35 02 287         7/1986
(Continued)

*Primary Examiner* — Roy King
*Assistant Examiner* — Xiaowei Su
(74) *Attorney, Agent, or Firm* — Kenyon & Kenyon LLP

(57) ABSTRACT

A method for manufacturing a metal composite component is characterized in that the composite component (60) is provided with at least two sections (61, 62, 63) of different magnetization, at least two sections (61, 62, 63) being situated on the one-piece component (60) in direct succession. The starting material for manufacturing the composite material (60) is a semi-austenitic steel, which is provided as a cylindrical blank. The blank is subsequently shaped into an intended shape of the composite component (60) and rendered magnetizable in a multistage forming and/or heat treatment process, the heat treatment being performed in such a way that the component has a saturation polarization $J_s$=0.9-1.5 T. This is followed by a local heat treatment in a partial area under simultaneous cooling of the areas of the composite component (60) where the magnetic properties are not to be changed, in order to define strictly delimited transitional areas between the different areas of magnetization (61, 62, 63). The composite component (60) is suitable in particular for use in electromagnetic valves, for example, including in fuel injectors of internal combustion engines.

14 Claims, 3 Drawing Sheets

(51) Int. Cl.
  *B32B 15/01* (2006.01)
  *C21D 1/26* (2006.01)
  *H01F 7/16* (2006.01)

(56) References Cited

U.S. PATENT DOCUMENTS

| | | | |
|---|---|---|---|
| 3,979,231 A * | 9/1976 | Gondo et al. | 148/593 |
| 4,896,409 A | 1/1990 | Rösch et al. | |
| 5,865,907 A * | 2/1999 | Katayama et al. | 148/120 |
| 8,245,394 B2 * | 8/2012 | Seitter et al. | 29/851 |
| 2003/0201584 A1 * | 10/2003 | Riggs | 266/104 |
| 2007/0042310 A1 * | 2/2007 | Clark et al. | 432/77 |

FOREIGN PATENT DOCUMENTS

| | | |
|---|---|---|
| DE | 42 37 405 | 6/1993 |
| EP | 1 061 140 | 12/2000 |
| EP | 1 450 380 | 8/2004 |
| GB | 2 262 659 | 6/1993 |
| JP | 54-161061 | 12/1979 |
| JP | 63-40304 | 2/1988 |
| JP | 06 074124 | 3/1994 |
| JP | 6-74124 | 3/1994 |
| JP | 6-346148 | 12/1994 |
| JP | 7-11397 | 1/1995 |
| JP | 2006-216885 | 8/2006 |
| WO | WO 2008/061829 | 5/2008 |

* cited by examiner

METHOD FOR MANUFACTURING A METAL COMPOSITE COMPONENT, IN PARTICULAR FOR AN ELECTROMAGNETIC VALVE

BACKGROUND OF THE INVENTION

1. Field of the Invention

The present invention is directed to a method for manufacturing a metal composite component for an electromagnetic valve.

2. Description of the Related Art

FIG. 1 shows a known fuel injector from the related art having a traditional three-part design of an inner metallic flow guide part and housing component at the same time. This inner valve tube is formed from an inlet connection forming an internal pole, a nonmagnetic intermediate part and a valve seat carrier accommodating a valve seat and is explained in greater detail in the description of FIG. 1.

Published German patent application document DE 35 02 287 A1 has already described a method for manufacturing a hollow cylindrical metal housing having two magnetizable housing parts and a nonmagnetic housing zone between them, magnetically separating the housing parts. This metal housing is premachined from a magnetizable blank in one piece down to an excess in the outside diameter, a ring groove being cut in the inside wall of the housing in the width of the intended central housing zone. With a rotating housing, a nonmagnetizable filler material is packed into the ring groove under heating of the ring groove area while maintaining the rotation of the housing until the filler material solidifies. Next the housing is reworked on the outside to the final dimension of the outside diameter, so there is no longer a connection between the magnetizable housing parts. A valve housing manufactured in this way may be used in the solenoid valves for anti-lock brake systems (ABS) in motor vehicles, for example.

In addition, published German patent application document DE 42 37 405 C2 describes a method for manufacturing a solid core for injectors for internal combustion engines (FIG. 5 of the document). These methods are characterized in that a one-piece sleeve-shaped magnetic martensitic workpiece is provided directly or via prior conversion processes, undergoing a local heat treatment in a central section of the magnetic martensitic workpiece to convert this central section into a nonmagnetic austenitic central section. Alternatively, in the local heat treatment by laser, molten austenite or molten ferrite-forming elements are added at the site of the heat treatment to form a nonmagnetic austenitic central section of the solid core.

SUMMARY OF THE INVENTION

The method according to the present invention for manufacturing a metal composite component has the advantage that a magnetic separation is implementable on a one-piece, e.g., sleeve-shaped composite component having narrowly limited transitional areas in a particularly simple and inexpensive manner suitable for reliable, large-scale industrial manufacturing. The composite component manufactured according to the present invention is characterized in that there are at least two neighboring sections of different magnetization, the magnetic restriction formed by the second section having a reduced saturation polarization $J_s$ in the composite component in comparison with the first sections being advantageously nonmagnetic or partially magnetic of an order of magnitude which ideally allows the use of such a composite component in an electromagnetic valve.

It is advantageous in particular to use a semi-austenitic stainless steel (e.g., 17-7PH, 15-8PH) in the form of a blank for the subsequent composite component. These materials are fundamentally difficult to shape or to deep draw because they tend to form deformation martensite and undergo strain-hardening. These mechanisms inherent in the material may be counteracted by the temperature assistance according to the present invention, so that neighboring sections of differing saturation polarization may ultimately be prepared in a composite component.

It is also advantageous that this allows a high flexibility in the geometric design of the composite component itself, e.g., in length, outside diameter, and gradations.

It is advantageous to manufacture in this way composite components, which are composed of at least one magnetic section and at least one nonmagnetic section or at least one magnetic section and at least one section having a partially reduced saturation polarization.

It is advantageous in particular to regulate the local heat treatment process instantaneously, where the regulating circuit includes an inductive generator, a pyrometer, and a regulator, and a noncontact temperature measurement takes place with the aid of the pyrometer. As an alternative to the inductive generator, the heat may also be introduced with the aid of a beam method (laser, electron beam).

BRIEF DESCRIPTION OF THE DRAWINGS

Exemplary embodiments of the present invention are shown in simplified form in the drawings and are described in greater detail in the following description.

DETAILED DESCRIPTION OF THE INVENTION

Before describing the characteristics of metal composite component 60 manufactured according to the present invention on the basis of FIGS. 2 and 5, a fuel injector of the related art will be explained in greater detail on the basis of FIG. 1 as a possible starting product for such a composite component 60.

Figure 1:
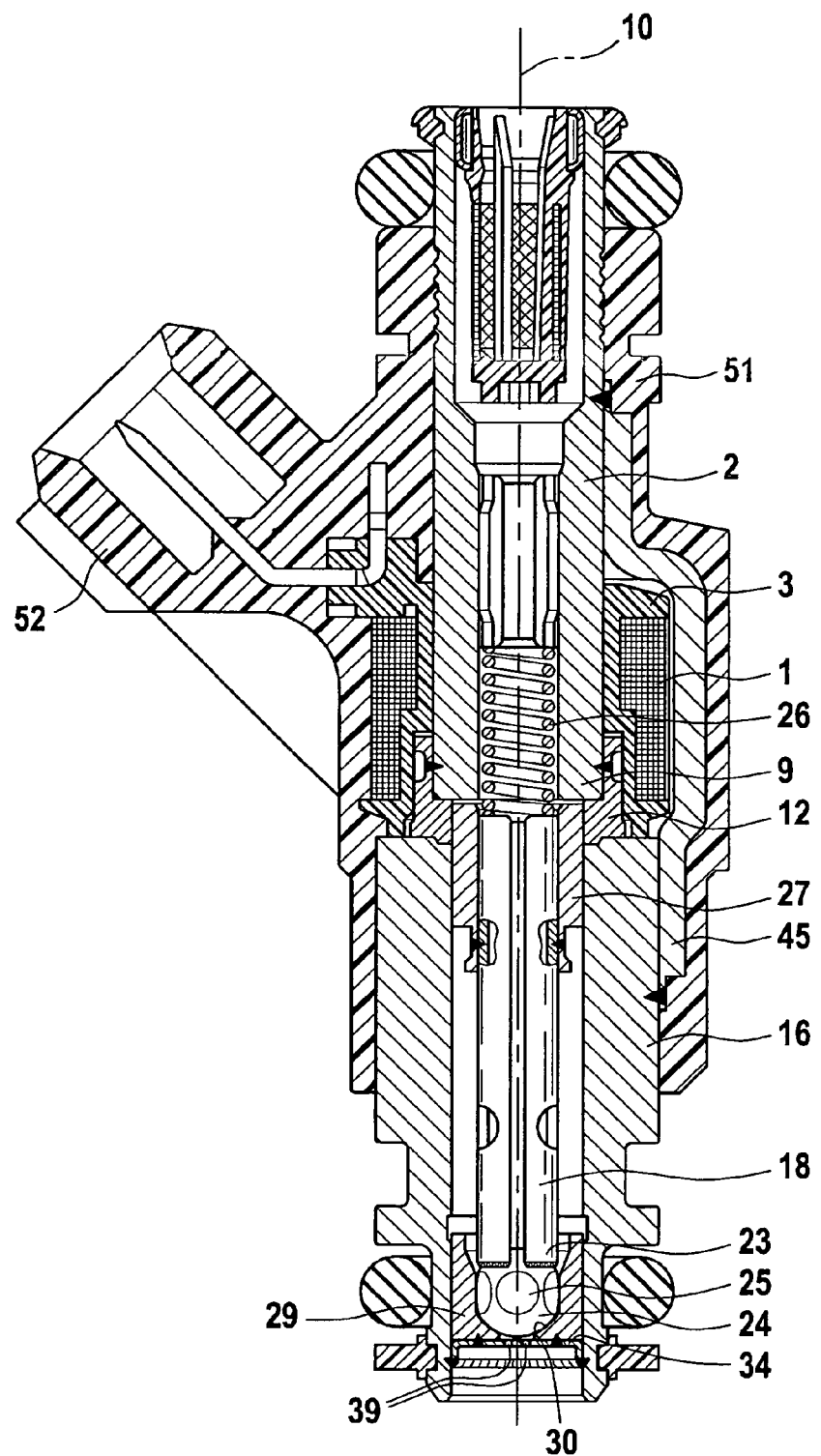
FIG. 1 shows a fuel injector according to the related art having a three-part interior metal valve tube as a housing.

The electromagnetically operable valve shown in FIG. 1 as an example in the form of an injector for fuel injection systems of mixture-compressing, spark-ignition internal combustion engines has a tubular core 2, which acts as a fuel inlet connection and internal pole; it is surrounded by solenoid 1 and has a constant outside diameter over its entire length, for example. A coil body 3, which is stepped in the radial direction, accommodates a winding of solenoid 1 and allows a compact design of the injector in the area of solenoid 1 in combination with core 2.

A tubular metal nonmagnetic intermediate part 12 is joined tightly by welding to a lower core end 9 of core 2 concentrically to a longitudinal axis 10 of the valve and partially surrounds core end 9 axially. A tubular valve seat carrier 16 extends downstream from coil body 3 and intermediate part 12 and is fixedly connected to an intermediate part 12. An axially movable valve needle 18 is situated in valve seat carrier 16. A spherical valve closing body 24 is provided on downstream end 23 of valve needle 18, five flattened areas 25 being provided on the circumference of the valve closing body to allow fuel to flow past.

The injector is operated electromagnetically in a known way. The electromagnetic circuit having solenoid 1, core 2 and armature 27 is used for axial movement of valve needle 18 and thus for opening the injector against the spring force of a restoring spring 26 and for closing the injector. Tubular armature 27 is fixedly connected, e.g., by a weld, to one end of valve needle 18 facing away from valve closing body 24 and is aligned with core 2. A cylindrical valve seat body 29 having a fixed valve seat 30 is tightly mounted by welding in the downstream end of valve seat carrier 16 facing away from core 2.

Spherical valve closing body 24 of valve needle 18 cooperates with valve seat 30 of valve seat body 29 tapering to form a truncated cone in the direction of flow. On its lower end face, valve seat body 29 is fixedly connected to a spray orifice disk 34, which is pot shaped, for example, and the valve seat body is tightly joined by a weld created using a laser, for example. At least one spray orifice, for example, four spray orifices 49 shaped by erosion or punching, are provided in spray orifice disk 34.

To conduct the magnetic flux to armature 27 for optimal operation of armature 27 when current is applied to solenoid 1 and thus for secure and accurate opening and closing of the valve, solenoid 1 is surrounded by at least one guide element 45, which is designed as a bow, for example, and functions as a ferromagnetic element, surrounding solenoid 1 at least partially in the circumferential direction and being in contact with core 2 at its one end and with valve seat carrier 16 on its other end and being connectable thereto, e.g., by welding, soldering or gluing. An inner metal valve tube as the basic structure and thus also the housing of the fuel injector form core 2, nonmagnetic intermediate part 12, and valve seat carrier 16, which are fixedly joined together and extend on the whole over the entire length of the fuel injector. All other function groups of the valve are situated inside or around the valve tube. This arrangement of the valve tube is the traditional three-part design of a housing for an electromagnetically operable unit such as a valve having two ferromagnetic or magnetizable housing areas, which are magnetically separated from one another by a nonmagnetic intermediate part 12 for effective conduction of the magnetic circuit lines in the area of armature 27 or they are at least connected to one another by a magnetic restriction.

The injector is largely surrounded by a plastic sheathing 51 which extends axially, starting from core 2, over solenoid 1 and the at least one guide element 45 to valve seat carrier 16, at least one guide element 45 being completely covered axially and circumferentially. This plastic sheathing 51 includes, for example, an integrally molded electric plug 52.

Figure 2:
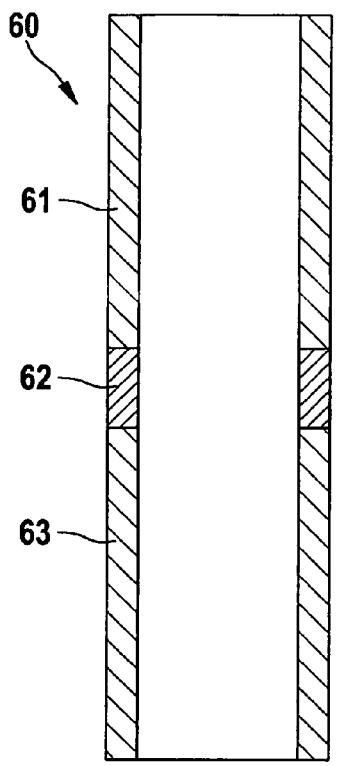
FIG. 2 shows a composite component according to the present invention having three sections.

FIG. 2 shows a composite component 60 manufactured according to the present invention composed of three sections 61, 62, 63. However, with this composite component 60, it is essential that at least one readily magnetizable section 61 is provided, which is followed directly by a one-piece second section 62 having reduced saturation polarization $J_s$.

A semi-austenitic stainless steel (e.g., 1.4568 or 15-8PH) is used as the starting material for composite component 60. In a method according to the present invention, a cylindrical blank of the aforementioned material is provided, for example. This blank is then shaped in a multistage forming operation to an intended shape of composite component 60 on the one hand and is subjected to a multistage heat treatment cycle on the other hand. All heat treatment steps and intensive cooling operations for the blank are ideally performed in a single heat treatment installation.

Due to the targeted heat treatment of the blank made of a semi-austenitic stainless steel, this material may assume different structural states and the magnetic properties may change, which is utilized for composite component 60 to be manufactured. These materials, which are not magnetizable in the annealed state, may be rendered magnetizable in a particular manner by a two-stage heat treatment. The first heat treatment step is conditioning, and the second heat treatment step is known as hardening. The magnetizable portion may be further maximized by an intermediate intensive cooling and/or a terminal intensive cooling. A maximum saturation polarization $J_s$=0.19-1.5 T is achievable through the optimized choice of temperature during conditioning and hardening as well as through the intensive cooling operation(s) because the residual austenite content is minimized in the best possible way.

After the last forming operation and/or the heat treatment cycle described previously, there is an aftertreatment under the influence of heat in a partial area to define section 62 of composite component 60 to be manufactured. The local heat treatment should be performed only in a very narrowly limited area to alter the magnetic properties only in a very precisely defined region. For partial heating of composite component 60, an inductive heat treatment (induction annealing) is suitable in particular but treatment using a laser beam or electron beam is also conceivable.

Figure 3:
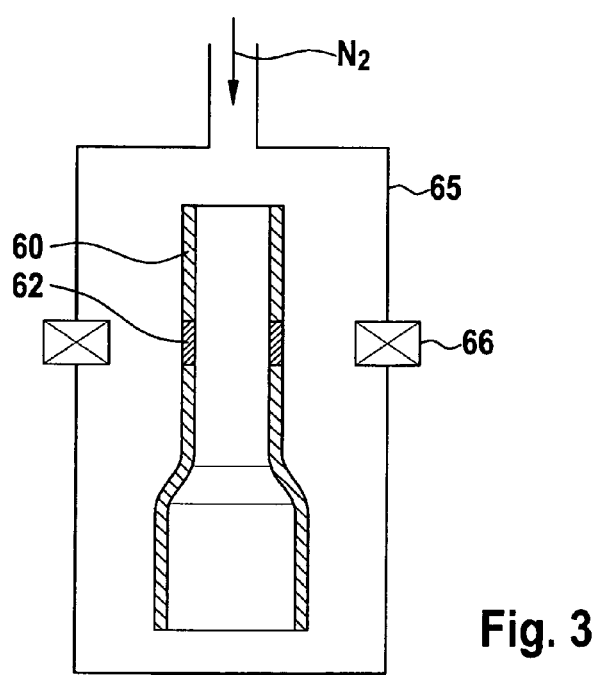
FIG. 3 shows a simplified arrangement for executing the method.
Figure 4:
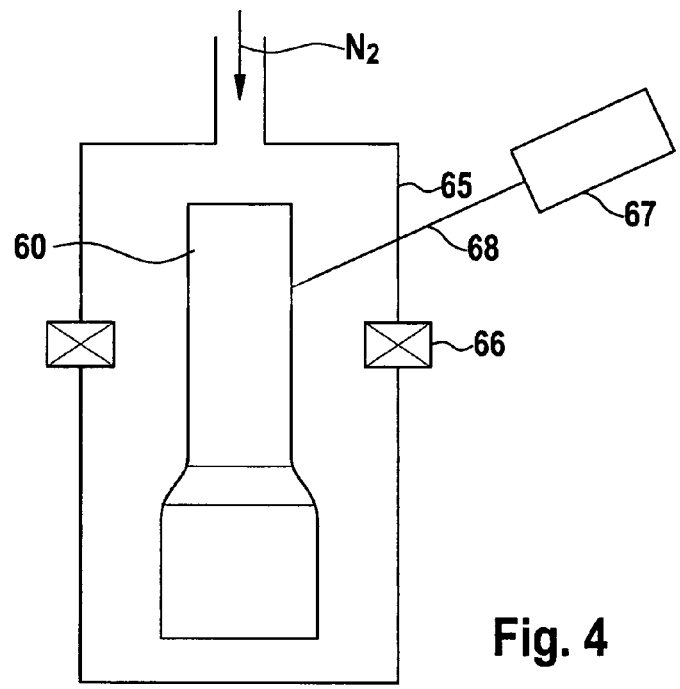
FIG. 4 shows a simplified measuring device.

The strict local limitation of the heating zone may advantageously be achieved by heat dissipation in the other areas of the component. As shown in FIG. 3, the heat dissipation may also be forced by convection using an oncoming gas flow (e.g., nitrogen cooling) or by flushing with a medium (e.g., underwater hardening). During the oncoming gas flow using nitrogen, composite component 60 is introduced into a component receptacle 65 in the form of a bell jar, for example. A volume flow of the protective gas conducted through component receptacle 65 is capable of dissipating heat directly from composite component 60 to be able to implement very narrow transitional areas on composite part 60. During induction annealing, local heating is accomplished using an induction coil 66. The heating and cooling processes are characterized in that an intended magnetization result in heat-treated section 62 is achievable through a defined heat treatment. The decisive process parameters here include the annealing time and temperature, which are regulated instantaneously during the heat treatment process. FIG. 4 shows in simplified terms how regulation is accomplished by a pyrometer 67, for example, for noncontact temperature measurement (measuring beam 68). The control circuit here includes an inductive generator, pyrometer 67 and a regulator. The heat treatment is performed at a temperature of at least 700° C. for a period of at least 2.5 s. Additionally or alternatively, cooling rings may also be mounted on composite part 60 as heat sinks. Furthermore, the chucking receptacle of composite part 60 may also be cooled.

The result of the partial heat treatment is characterized in that the heat-treated zone (section 62) has a defined length of 1-10 mm, for example, over which it has the same magnetic properties, and the transitional area(s) between section 62 and magnetic sections 61, 63 is/are very small in extension (e.g., 1 mm).

The terminal local heat treatment described here is completed in such a way that composite component 60 includes at least one magnetic section 61 (saturation polarization $J_s$=0.9-1.5 T) and at least one nonmagnetizable section 62 (saturation polarization $J_s$=0 T), or composite component 60 includes at least one magnetic section 61 (saturation polarization $J_s$=0.9-1.5 T) and at least one section 62 having a partially reduced saturation polarization (saturation polarization $J_s$=0.01-0.3 T).

Figure 5:
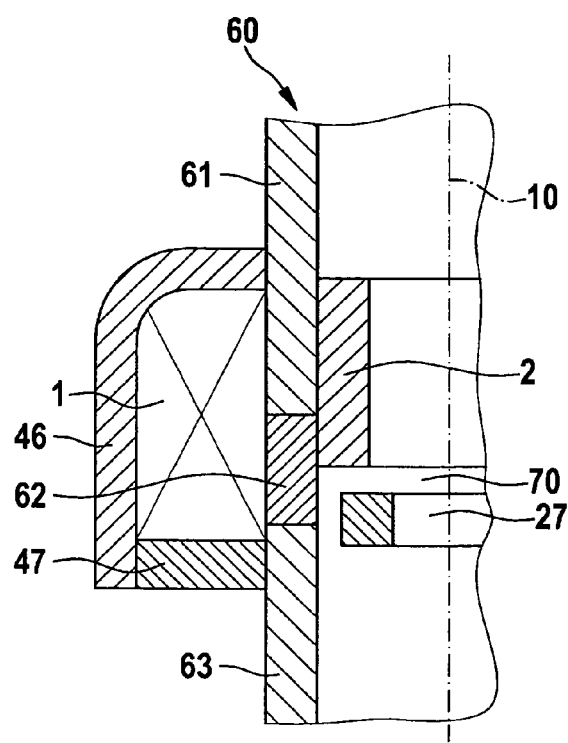
FIG. 5 shows a schematic detail of an injector having a composite component manufactured according to the present invention to illustrate one possible application.

FIG. 5 shows a schematic detail of a fuel injector having a composite component 60 according to the present invention, which is installed in the valve as a thin-walled sleeve and surrounds core 2 and armature 27 radially and circumferentially, while being surrounded itself by solenoid 1. It becomes clear that central section 62 of composite component 60 is situated between core 2 and armature 27 in the axial extension of a working air gap 70 in order to optimally and effectively conduct the magnetic circuit lines in the magnetic circuit. Instead of clamp-shaped guide element 45 shown in FIG. 1, the outer magnetic circuit component is designed as magnet pot 46, for example, the magnetic circuit between magnet pot 46 and housing 66 being closed by a cover element 47. Metal composite component 60 may be used not only as a valve sleeve in an electromagnetic valve but also as core 2, for example.

The present invention is by no means limited to use in fuel injectors or solenoid valves for anti-lock brake systems. Composite components 60 manufactured according to the present invention may be used in general in units in which successive zones of different magnetism are required. Composite component 60 according to the present invention is manufacturable not only with two or three successive sections but also with more than three sections.

What is claimed is:

1. A method for manufacturing a metal composite component that includes a one-piece component, the composite component being provided with at least two sections of different magnetization, the at least two sections being situated on the one-piece component in direct succession, the method comprising: shaping a semi-austenitic steel blank into an intended shape of the composite component and rendering it magnetizable in a heat treatment process, the heat treatment being performed in such a way that the component has a saturation polarization $J_s$=0.9-1.5 T, wherein a terminal local heat treatment is performed in a partial area under simultaneous cooling of the areas of the composite component where the magnetic properties are not to be altered, wherein the local heat treatment is performed in the partial area in such a way that the partial area has a saturation polarization of one of $J_s$=0 T and $J_s$ in a range of 0.01 to 0.3 T, and wherein the composite component is shaped in such a way that it has the form of a hollow cylindrical sleeve.

2. The method for manufacturing a metal composite component as recited in claim 1, wherein the local heat treatment is performed as an induction annealing operation under the influence of heat.

3. The method for manufacturing a metal composite component as recited in claim 2, wherein an annealing time and temperature are regulated instantaneously during the local heat treatment process.

4. The method for manufacturing a metal composite component as recited in claim 1, wherein heat is dissipated from the composite component by convection using an oncoming gas flow during the local heat treatment.

5. The method for manufacturing a metal composite component as recited in claim 4, wherein cooling rings are mounted on the composite component as heat sinks in addition to the oncoming gas flow or as an alternative.

6. The method for manufacturing a metal composite component as recited in claim 1, wherein heat is dissipated from the composite component by convection using an oncoming gas flow during the local heat treatment.

7. The method for manufacturing a metal composite component as recited in claim 1, wherein nitrogen flows around the composite component in a component receptacle.

8. The method for manufacturing a metal composite component as recited in claim 7, wherein the component receptacle is implemented in the form of a bell jar.

9. The method for manufacturing a metal composite component as recited in claim 1, wherein the local heat treatment is performed at a temperature of at least 700° C. for a period of at least 2.5 s.

10. The method for manufacturing a metal composite component as recited in claim 1, wherein a noncontact temperature measurement is performed during the local heat treatment using a pyrometer.

11. The method for manufacturing a metal composite as recited in claim 1, wherein a chucking receptacle of the composite component is cooled.

12. The method for manufacturing a metal composite component as recited in claim 1, wherein the cooling takes place during the local heat treatment in such a way that at least one transitional area between a heat-treated section and a neighboring magnetic section amounts to only 1 mm in its extension.

13. The method for manufacturing a metal composite component as recited in claim 1, wherein the composite component is insertable as a valve sleeve or a core.

14. The method for manufacturing a metal composite component as recited in claim 1, which is for an electromagnetic valve.

* * * * *